(12) United States Patent
Sakanoue et al.

(10) Patent No.: US 9,380,863 B2
(45) Date of Patent: Jul. 5, 2016

(54) FOLDING TABLE

(71) Applicants: NIPPON SHARYO, LTD., Nagoya-shi, Aichi (JP); CENTRAL JAPAN RAILWAY COMPANY, Nagoya-shi, Aichi (JP)

(72) Inventors: Kei Sakanoue, Nagoya (JP); Hajime Ito, Hamamatsu (JP); Tadashi Fujii, Machida (JP); Hiroaki Isogai, Yokohama (JP); Kenichi Tanaka, Toyokawa (JP); Takehiro Ishigami, Kani (JP); Toshihiro Suzuki, Kakamigahara (JP)

(73) Assignees: NIPPON SHARYO, LTD., Aichi (JP); CENTRAL JAPAN RAILWAY COMPANY, Aichi (JP)

( * ) Notice: Subject to any disclaimer, the term of this patent is extended or adjusted under 35 U.S.C. 154(b) by 0 days.

(21) Appl. No.: 14/439,262

(22) PCT Filed: Oct. 30, 2013

(86) PCT No.: PCT/JP2013/079414
§ 371 (c)(1),
(2) Date: Apr. 29, 2015

(87) PCT Pub. No.: WO2014/073432
PCT Pub. Date: May 15, 2014

(65) Prior Publication Data
US 2015/0282608 A1    Oct. 8, 2015

(30) Foreign Application Priority Data

Nov. 8, 2012   (JP) ................. 2012-245982

(51) Int. Cl.
*A47B 5/04*    (2006.01)
*A47B 5/00*    (2006.01)
(Continued)

(52) U.S. Cl.
CPC . *A47B 5/006* (2013.01); *A47B 5/04* (2013.01); *B60N 3/002* (2013.01); *B60N 3/004* (2013.01); *E05D 3/12* (2013.01); *E05D 3/18* (2013.01)

(58) Field of Classification Search
CPC ............ A47B 5/00; A47B 5/04; A47B 5/006; A47B 23/02; A47B 23/025; A47B 23/04; E05D 3/12; E05D 3/18; B60N 3/004
See application file for complete search history.

(56) References Cited

U.S. PATENT DOCUMENTS

| 5,876,092 A * | 3/1999 | An .................. B60N 3/004 297/146 |
| 6,520,558 B1 * | 2/2003 | Katterloher ............ B60J 7/1621 16/358 |

(Continued)

FOREIGN PATENT DOCUMENTS

| JP | 10-35339 A | 2/1998 |
| JP | 11-247394 A | 9/1999 |

(Continued)

OTHER PUBLICATIONS

International Preliminary Report on Patentability issued by the International Searching Authority in counterpart International application No. PCT/JP2013/079414, mailed on May 21, 2015.

(Continued)

*Primary Examiner* — Daniel Rohrhoff
(74) *Attorney, Agent, or Firm* — Sughrue Mion, PLLC

(57) ABSTRACT

A folding table includes: a table body provided with a pair of hinge pins and a pair of lock pins, each of the pairs protruding oppositely in left-right direction; and a pair of left and right brackets having shaft holes in which the hinge pins are inserted and movable holes in which the lock pins are inserted. Spring members mounted in the movable holes press the lock pins. The table body is rotatably supported by the brackets affixed to a wall surface. The folding table has closing plates having through-holes respectively through which the hinge pins and the lock pins are penetrated. The closing plates are sandwiched between the table body and the brackets to close the movable holes.

10 Claims, 6 Drawing Sheets

(51) Int. Cl.
 *B60N 3/00* (2006.01)
 *E05D 3/12* (2006.01)
 *E05D 3/18* (2006.01)

(56) References Cited

U.S. PATENT DOCUMENTS

| | | | | |
|---|---|---|---|---|
| 2002/0029523 | A1* | 3/2002 | Fukuo | E05F 1/1215 49/1 |
| 2004/0124327 | A1* | 7/2004 | Cheng | A47B 46/005 248/244 |
| 2009/0078169 | A1* | 3/2009 | Osborne | A47B 5/006 108/40 |
| 2013/0169009 | A1* | 7/2013 | Petersen | B60N 3/004 297/163 |
| 2015/0041421 | A1* | 2/2015 | Duke | A47B 5/00 211/150 |

FOREIGN PATENT DOCUMENTS

| | | |
|---|---|---|
| JP | 2001-204646 A | 7/2001 |
| JP | 2011-15746 A | 1/2011 |

OTHER PUBLICATIONS

International Search Report of PCT/JP2013/079414, dated Jan. 28, 2014. [PCT/ISA/210].

* cited by examiner (a)

(b)

(c)

(d)

FOLDING TABLE

CROSS REFERENCE TO RELATED APPLICATIONS

This is a US national phase application based on the PCT International Patent Application No. PCT/JP2013/079414 filed on Oct. 30, 2013, and claiming the priority of Japanese Patent Application No. 2012-245982 filed on Nov. 8, 2012, the entire contents of which are herewith incorporated by reference.

TECHNICAL FIELD

The present invention relates to a folding table configured by making a simple change to a conventional folding table to prevent insertion of foreign matters into a hole or holes.

BACKGROUND ART

For instance, high-speed rail vehicles and the like are provided with a table for each seat. For a first-row seat, particularly, a table is provided so that a table body is pivotally mounted on brackets fixed to a front wall. The folding table is configured such that the table body is able to rotate, or pivot, between a non-use state in which the table body is oriented upright along the wall and a use state in which the table body is tilted horizontally. FIG. 7 is a perspective view showing a configuration of a shaft part of a folding table disclosed in Patent Document 1 listed below.

In this folding table 100, a table body 102 has a hinge pin 105 which is fitted in a shaft hole of a bracket 103. The table body 102 can be pivoted about the hinge pin 105. The bracket 103 has a movable hole 110 formed larger than the shaft hole. In this movable hole 110, spring members 111 and 112 are installed. The table body 102 is provided with a lock pin 106 in addition to the hinge pin 105. This lock pin 106 is pressed against the wall of the movable hole 110 so as to be held in each of positions corresponding to the use state and the non-use state of the table body 102.

RELATED ART DOCUMENTS

Patent Documents

Patent Document 1: JP-A-2011-15746

SUMMARY OF INVENTION

Problems to be Solved by the Invention

Meanwhile, in the conventional folding table shown in FIG. 7, the movable hole 110 of the bracket 103 is always closed by the table body 102. This is to avoid exposure of the hinge pin 105 and the lock pin 106, in particular, the movable hole 110. In other conventional folding tables than that shown in FIG. 7, a movable hole 110 is exposed in a non-use state in which a table body is oriented upright and thus foreign matters may enter in the movable hole 110. When the table body 102 is tilted with the foreign matters remaining entered, there is a risk that the foreign matters are caught, thus restricting the pivoting operation of the table body 102. This makes the table body 102 unusable or breaks a part or parts thereof if this table body 102 is forced to pivot. In this regard, the conventional example shown in FIG. 7 can address such a problem; however, this conventional example shown in FIG. 7 needs redesign and remanufacturing of a new folding table. This leads to replacement of all the existing tables, resulting in large cost increase.

The present invention has been made to solve the above problems and has a purpose to provide a folding table configured by utilizing an existing folding table to prevent entrance of foreign matters in a movable hole.

Means of Solving the Problems

To achieve the above purpose, one aspect of the invention provides a folding table including a table body provided with a pair of hinge pins oppositely protruding on left and right sides and a pair of lock pins oppositely protruding on left and right sides, and a pair of left and right brackets each having a shaft hole in which the hinge pin serving as a pivotal center is inserted and a movable hole in which a spring member is installed to urge the lock pin inserted therein, the table body being supported pivotally by the brackets fixed to a wall surface, wherein the folding table includes closing plates that are plate members each having through holes through which the hinge pin and the lock pin of the table body are penetrated, and the closing plates are individually sandwiched between the table body and the brackets to close the movable holes.

In the folding table in the above aspect of the invention, preferably, the through holes through which the hinge pin and the lock pin are individually penetrated are long holes, the through hole through which the lock pin is penetrated is smaller than a moving range of the lock pin to allow the closing plate to slide in association with pivoting of the table body.

In the folding table in the above aspect of the invention, preferably, a part of the closing plate has a shape conforming to outer shapes of the table body and the brackets seen from side in a use state in which the table body is tilted down and in a non-use state in which the table body is oriented upright.

In the folding table in the above aspect of the invention, preferably, each of the brackets includes a step on an open side of the movable hole to define a movable range in which the closing plate is allowed to slide, so that each of the brackets provides a recessed area corresponding to the movable range.

In the folding table in the above aspect of the invention, preferably, in a use state in which the table body is tilted down and a non-use state in which table body is oriented upright, the closing plates are positioned by abutting on the steps.

Effects of the Invention

According to the present invention, a closing plate is provided to be sandwiched between a table body and a bracket to close or cover a large movable hole to reduce an exposed area of the movable hole, thereby enabling preventing entrance of foreign matters in the movable hole. In particular, the present invention is configured to prevent entrance of foreign matters by use of the closing plate, so that there is no need to redesign and remanufacture a folding table itself, different from the conventional example. The present invention utilizing an existing folding table can achieve the same effects without increasing costs as with the effects in the conventional example.

MODE FOR CARRYING OUT THE INVENTION

Figure 1:
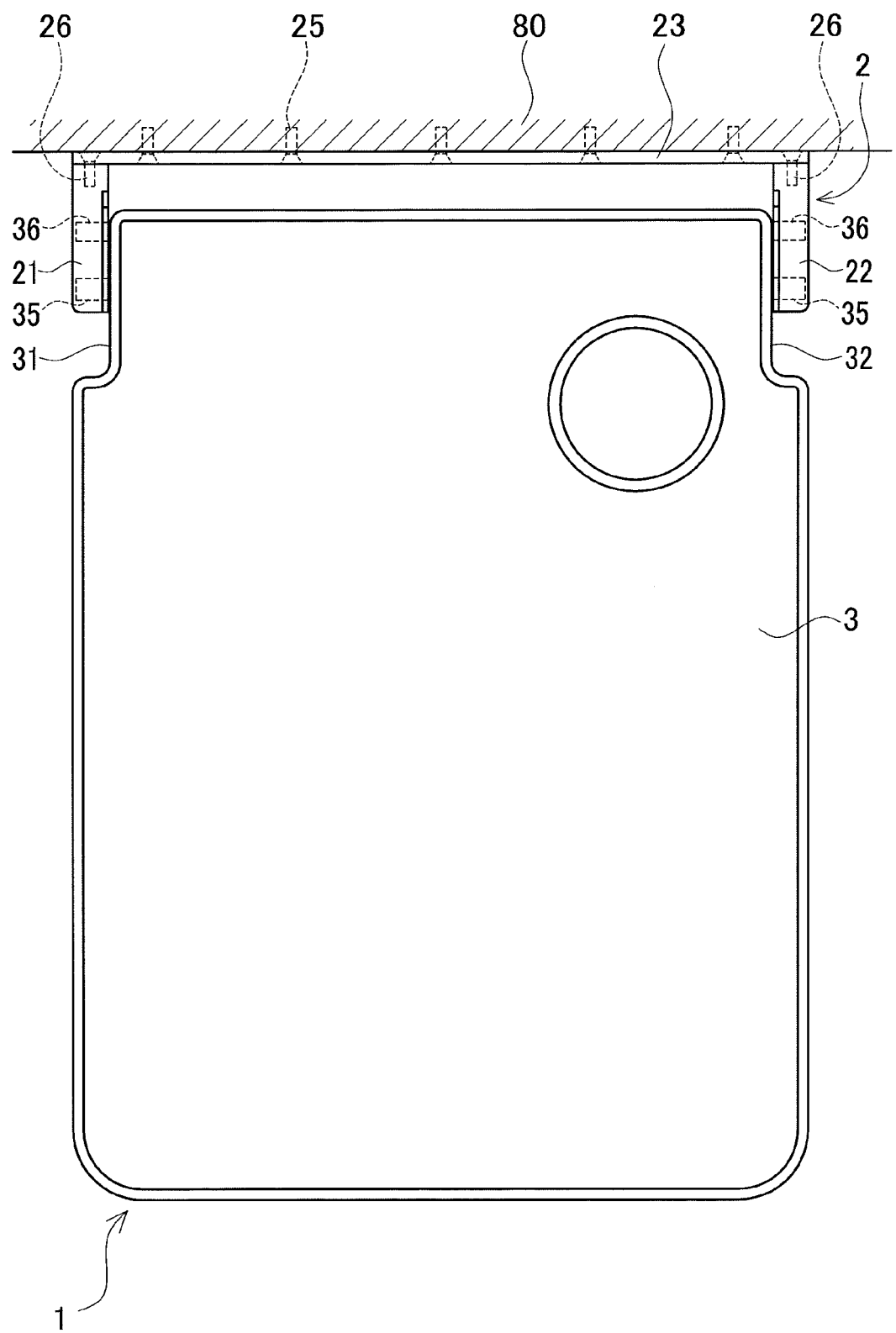
FIG. 1 is a plan view showing a use state of a folding table in an embodiment.
Figure 2:
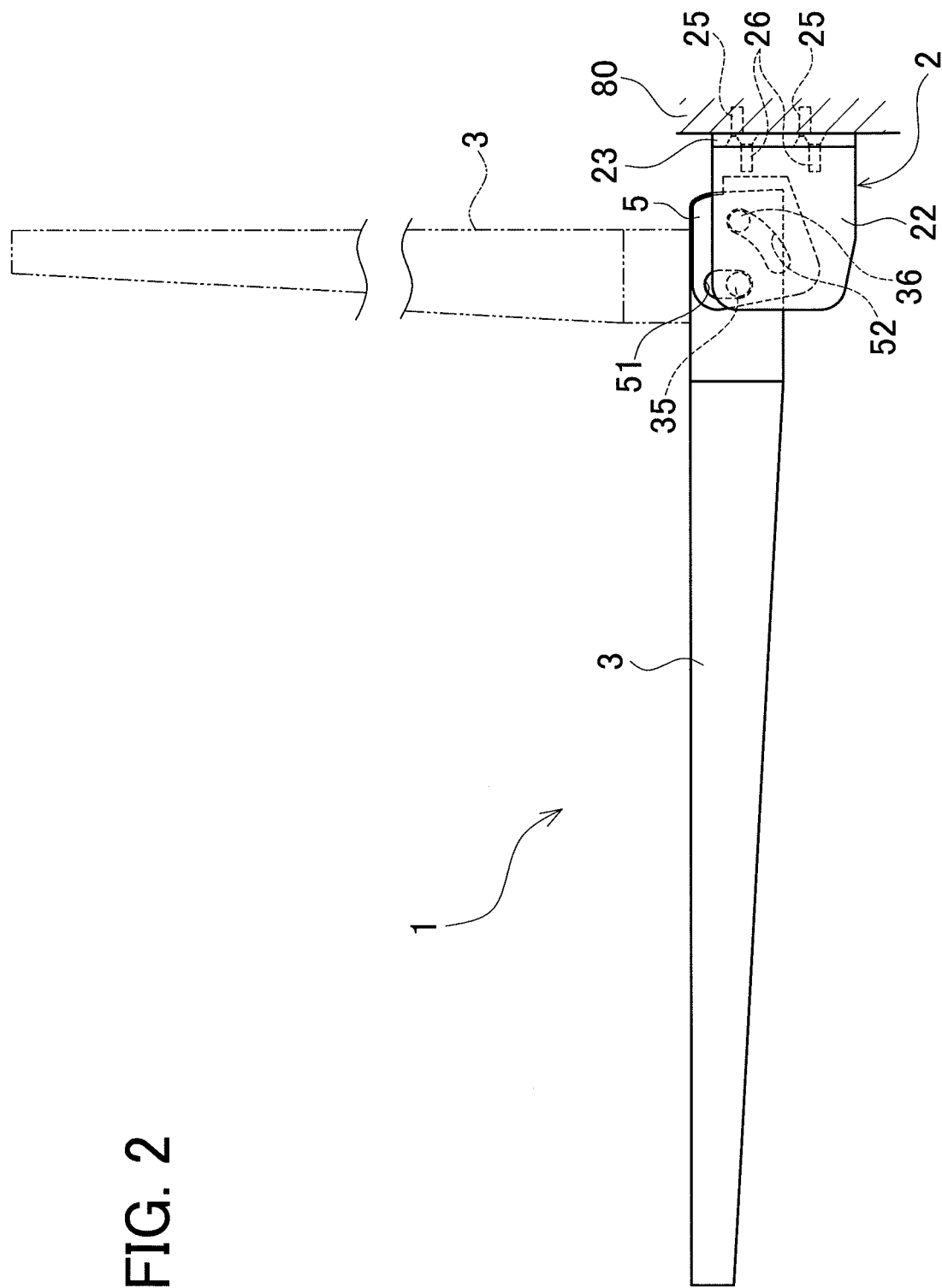
FIG. 2 is a side view showing the use state of the folding table in the embodiment.

A detailed description of a preferred embodiment of a folding table embodying the present invention will now be given referring to the accompanying drawings. The folding table in this embodiment will be explained as one used in a railway carriage. Specifically, a folding table provided on a wall in front of a first-row seat will be explained. FIG. 1 is a plan view showing a use state of the folding table. FIG. 2 is a side view showing the use state of the same folding table.

The folding table 1 is configured, as with the conventional folding table, such that a supporting member 2 is fixed to a wall 80, and a table body 3 is pivotally supported on the supporting member 2. The supporting member 2 includes left and right brackets 21 and 22 integrally formed at ends of a fixed part 23. The fixed part 23 of the supporting member 2 is fixed to the wall 80 with screws 25 so that the brackets 21 and 22 protrude horizontally from the wall 80. The brackets 21 and 22 are removably attached to the fixed part 23 with screws 26.

Figure 3:
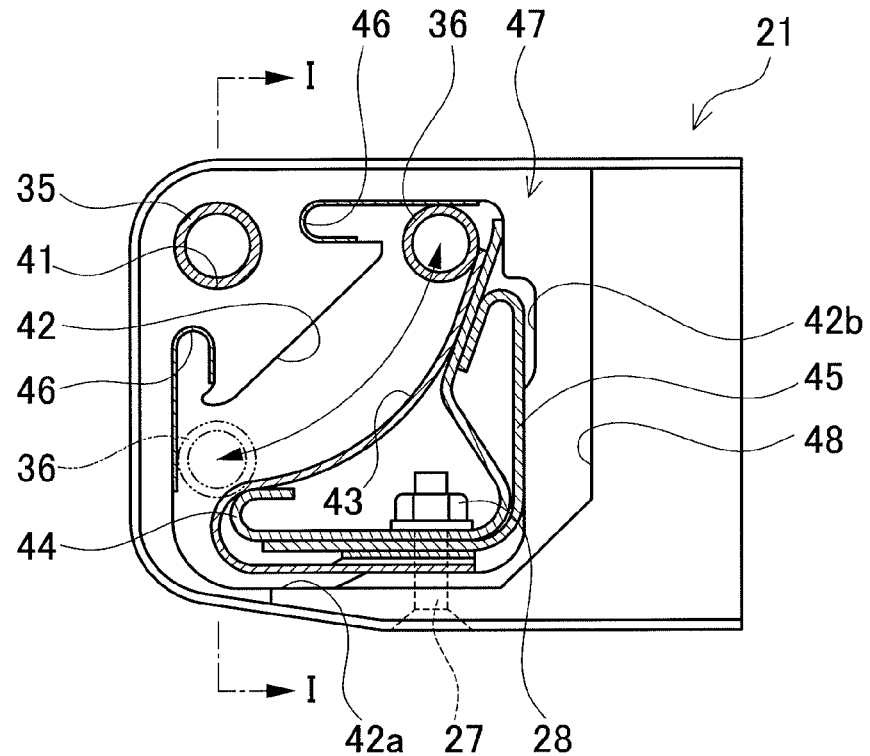
FIG. 3 is an internal side view of a bracket of the folding table.

The table body 3 has left and right shoulders 31 and 32 formed in a cut-out shape according to the shapes of the brackets 21 and 22 respectively. Each of these shoulders 31 and 32 is provided with two pins protruding therefrom. One of the two pins is a hinge pin 35 serving as a pivotal center of the table body 3 and the other is a lock pin 36 to retain the posture of the table body 3. Each of the brackets 21 and 22 of the supporting member 2 is formed with holes receiving the hinge pin 35 and the lock pin 36. FIG. 3 is an internal side view of the bracket 21 of the supporting member 2. The opposite bracket 22 is configured to be symmetrical to the bracket 21 and thus its figure and explanation are omitted.

The bracket 21 is a plate-like member having a predetermined thickness as shown in FIG. 1 and is formed with a circular shaft through-hole 41 and a movable hole 42 large enough to allow the lock pin 36 to move. In the movable hole 42, a plurality of spring members are mounted and fixed with a bolt 27 and a nut 28. Each of the spring members is made of a strip-shaped metal bent in a predetermined shape to urge the lock pin 36. These spring members include a spring member 43 having a curved surface along a movement path of the lock pin 36 which will move in a circular arc, and further spring members 44 and 45 elastically supporting the spring member 43, and others.

The spring member 43 is continuously in pressure contact with the lock pin 36. In particular, the urging forces of the spring members 44 and 45 act at both end portions of the spring member 43 in a moving direction of the lock pin 36 which will move in a circular arc, that is, at positions of the lock pin 36 indicated by solid lines and broken lines in FIG. 3. The movable hole 42 is formed with recesses 42a and 42b in correspondence with the urging positions so that the spring members 44 and 45 are allowed to warp in a depth direction of each corresponding recess 42a and 42b.

In the movable hole 42, protecting plates 46 are fitted one at each of positions corresponding to both ends in the moving direction of the lock pin 36. Therefore, the lock pin 36 located in either end in the moving direction is pressed against the protecting plate 46 by reaction force of the spring member 44 or 45 pressed and warped toward the recess 42a or 42b. The lock pin 36 is thus positioned, retaining the table body 3 in the use state or non-use state. The position of the lock pin 36 illustrated with the solid lines represents the use state of the folding table 1 with the table body 3 tilted horizontally and the position of the same illustrated with the broken lines represents the non-use state of the folding table 1 with the table body 3 oriented upright along the wall.

Figure 4:
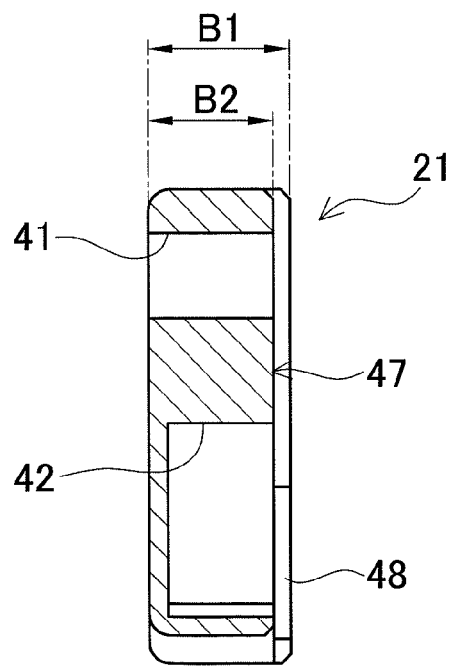
FIG. 4 is a sectional view of the bracket taken along I-I in FIG. 3.

The bracket 21 is formed with a step 48 to define a movable range 47 provided with the shaft hole 41 and the movable hole 42. Specifically, the bracket 21 has a thin thickness to provide a recessed area corresponding to the movable range 47. Herein, FIG. 4 is a sectional view of the bracket 21 taken along I-I in FIG. 3. The bracket 21 in the present embodiment is designed with a thickness B1 of 17 mm and the movable range 47 is designed with a thickness B2 of 15 mm. In the present embodiment, the step 48 is formed on an open side of the movable hole 42, thereby providing a gap between the bracket 21 and the table body 3 by an amount corresponding to the step. In this gap, a closing plate 5 having a thickness of 1.7 mm is inserted.

Figure 5:
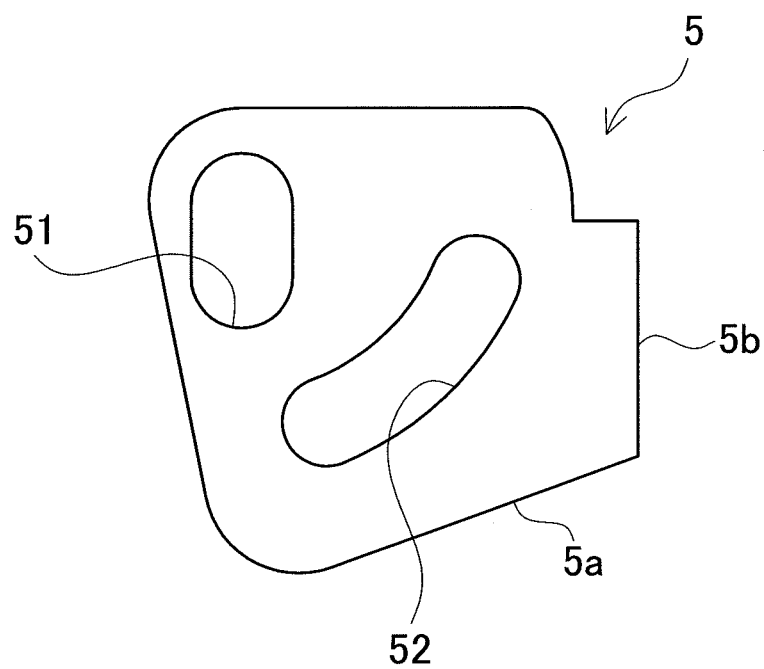
FIG. 5 is a view of a closing plate.

FIG. 5 is a view showing the closing plate 5. This closing plate 5 is placed to close the movable hole 42 of the bracket 21 to prevent foreign matters from entering in the movable hole 42. The closing plate 5 has such a shape as shown in the figure having a shaft-side oval through hole 51 through which the hinge pin 35 is penetrated and a movable-hole-side curved oval through hole 52 through which the lock pin 36 is penetrated. These through holes 51 and 52 are both long holes. The closing plates 5 are individually held, or sandwiched, between the bracket 21 and the table body 3 and between the bracket 22 and the table body 3 while the hinge pins 35 and the lock pins 36 are penetrated through the closing plates 5 as shown in FIG. 1.

In the present embodiment, as above, the closing plate 5 which is not present in the conventional art is additionally provided and the bracket 21 is formed with the step 48 to receive the closing plate 5. The supporting member 2 of the folding table 1 consists of the brackets 21 and 22 integrally fixed to the fixed part 23 with screws. For this folding table 1, therefore, the table body 3 and fixed part 23 of the supporting member 2 which are conventionally used are utilized as-is, and the closing plates 5 and the brackets 21 and 22 are newly designed and manufactured.

The folding table 1 is configured as shown in FIGS. 1 and 2 such that the supporting member 2 is fixed to the wall 80 and the table body 3 is pivotally attached to the brackets 21 and 22. The hinge pins 35 and the lock pins 36 of the table body 3 are inserted in the shaft holes 41 and the movable holes 42 of the corresponding brackets 21 and 22. At that time, the closing plates 5 are put between the table body 3 and the brackets 21 and 22 so that the hinge pins 35 and the lock pins 36 are penetrated respectively through the shaft-side through holes 51 and the movable-hole-side through holes 52.

Figure 6:
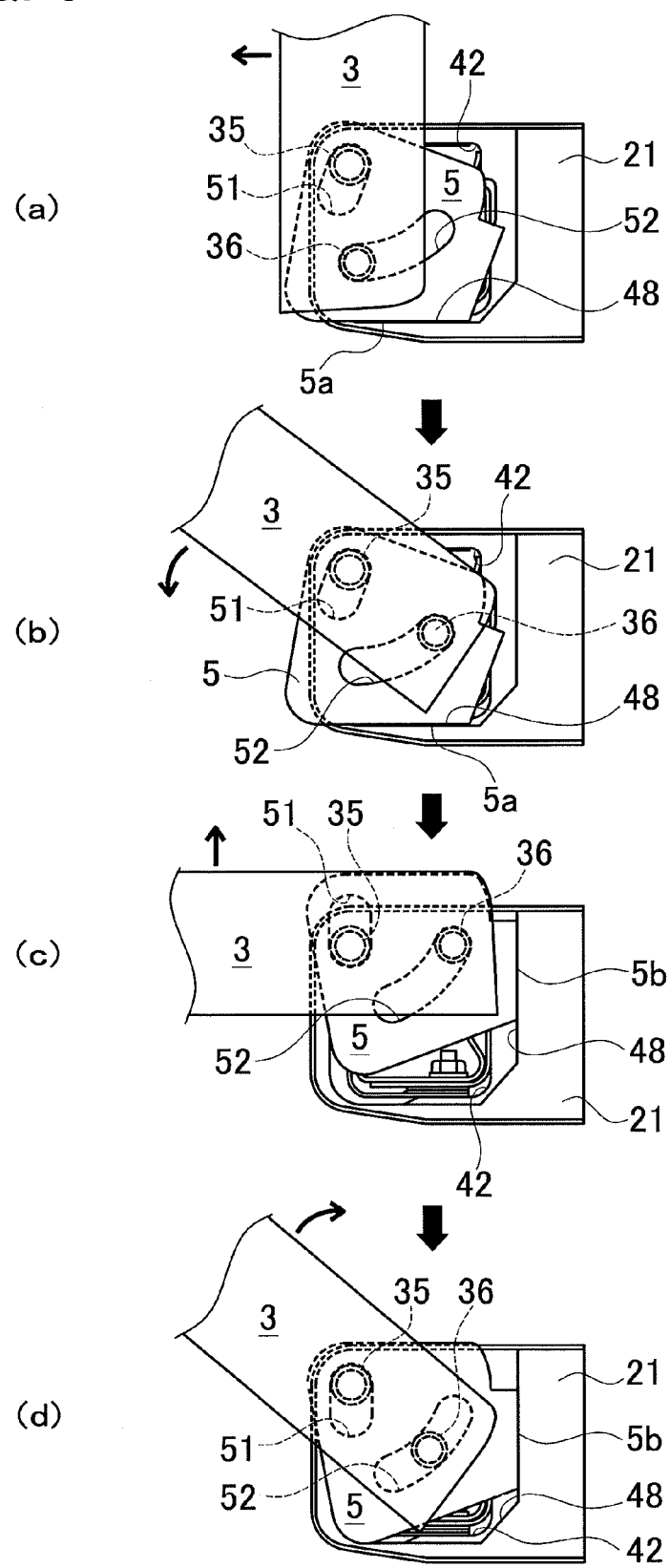
FIGS. 6(a)-6(d) are diagrams each showing a state of the closing plate associated with pivoting of a table body.
Figure 7:
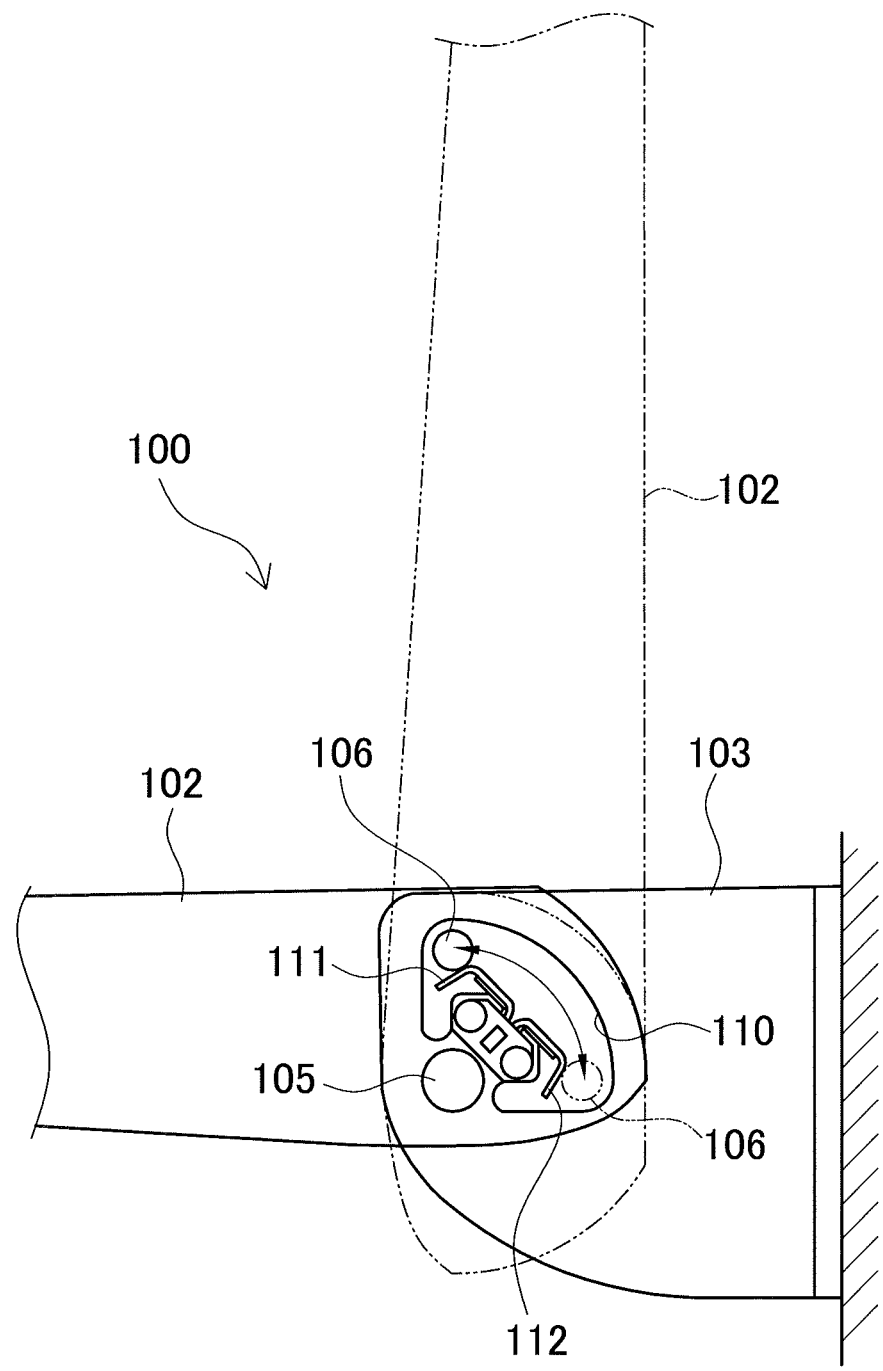
FIG. 7 is a perspective view showing a configuration of a shaft part of a conventional folding table.

Next, operations of the folding table 1 will be explained. FIG. 6 are diagrams each showing a state of the closing plate 5 associated with rotating, or pivoting, of the table body 3; (a) to (d) sequentially represent (a) a non-use state in which the table body 3 is oriented upright along the wall, (b) an intermediate state of the table body 3 being tilting down to a use position, (c) a use state in which the table body 3 is horizontally tilted, and (d) an intermediate state of the table body 3 being tilting up to a non-use position.

The folding table 1 is normally in the non-use state with the table body 3 oriented upright as shown in FIG. 6(*a*). Thus, a rider or passenger seated on the first-row seat will tilt the table body 3 down to the near side (leftward in the figure) in use. When tilted to the near side, the table body 3 is pivoted about the hinge pin 35 and inclined as shown in FIG. 6(*b*). At that time, each of the lock pins 36 (see FIG. 3) is moved from the position indicated by the broken lines to the position indicated by the solid lines by sliding on the curved surface of the corresponding spring member 43. The movable-hole-side through hole 52 of the closing plate 5 is short than the moving range of the lock pin 36. Thus, the lock pin 36 abuts on the through hole 52 in the course of movement as shown in FIG. 6(*b*), and then the closing plate 5 is caused to slide by engagement with the lock pin 36. As shown FIG. 6(*c*), accordingly, the closing plate 5 is moved upward in association of movement of the lock pin 36, and the hinge pin 35 relatively shifts downward within the shaft-side through hole 51.

In the present embodiment, to slid the closing plate 5 in the above way, the shaft-side through hole 51 for the hinge pin 35 is designed as an oval hole, not a circular hole, and the movable-hole-side through hole 52 is formed smaller, or shorter, than the moving range of the lock pin 36 as described above. This is to allow the closing plate 5 to slide, so that the size of the closing plate 5 itself is reduced. Because of the reduced size of the closing plate 5, the closing plate 5 is less likely to protrude from the table body 3 and the bracket 21 when seen from side in the non-use state in FIG. 6(*a*) and the use state in FIG. 6(*c*).

Accordingly, the closing plate 5 is intended to close the movable hole 42 but configured not to protrude from the table body 3 and the bracket 21. A part of the closing plate 5 has a shape conforming to the outer shapes of the table body 3 and the bracket 21 seen from side in the non-use state (a) and the use state (c). Furthermore, the closing plate 5 has such a shape that two straight sides 5*a* and 5*b* abut on the step 48 of the bracket 21 respectively in the non-use state (a) and the use state (c) to position the closing plate 5. In the use state in which the table body 3 is horizontally oriented as shown in FIG. 6(*c*), the closing plate 5 is positioned in place with the side 5*b* abutting on the step 48.

In the use state shown in FIG. 6(*c*), the urging force of the spring members act on the lock pin 36 to retain the posture of the table body 3, thereby preventing the table body 3 from rattling due to vibration while the vehicle is running. Specifically, the lock pin 36 located at the position indicated by the solid lines in FIG. 3 presses a return portion of the spring member 45 toward the recess 42*b* and thus is pressed against the protecting plate 46 by the reaction force of the spring member 45. In this way, the table body 3 of the folding table 1 is retained in the use state. When the folding table 1 is to be brought in the non-use state, a passenger or rider orients the table body 3 in the upright position in such a way so as to flip up a distal end of the table body 3 from the state shown in FIG. 6(*c*). At that time, the table body 3 is pivoted about the hinge pins 35 and tilted as shown in FIG. 6(*d*).

The lock pin 36 (see FIG. 3) is caused to slide on the curved surface of the spring member 43 and move from the position indicated by the solid lines to the position indicated by the broken lines. In mid-course thereof, the closing plate 5 is slid downward as shown in FIG. 6(*d*). Since the moving path of the lock pin 36 does not coincide with the shape of the movable-hole-side through hole 52, the closing plate 5 is pushed down by the lock pin 36 moving within the movable-hole-side through hole 52. Thereafter, the closing plate 5 is also slid in a rotation direction and then positioned with the side 5*a* abutting on the step 48 as shown in FIG. 6(*a*). Thus, the table body 3 is made upright and the folding table 1 comes to the non-use state.

Since the lock pins 36 receive the urging forces of the spring members, the table body 3 can be maintained upright in the non-use state without tilting down due to vibrations even during running. Specifically, the lock pin 36 located at the position shown by the broken lines in FIG. 3 presses a return portion of the spring member 44 toward the recess 42*a* and thus is pressed against the protecting plate 46 by the reaction force of the spring member 44. In this way, the folding table 1 is retained in the non-use state with the table body 3 oriented upright.

The folding table 1 in the present embodiment will be switched between the non-use state shown in FIG. 6(*a*) and the use state shown in FIG. 6(*c*) as described above. In each of the above states, the closing plate 5 covers the movable hole 42. The closing plate 5 has such a shape as not to protrude out of the table body 3 and the bracket 21 in each of the use state and the non-use state to reduce an exposed portion of the movable hole 42. The closing plate 5 cannot completely close the movable hole 42; however, the spring members 43, 44, and 45 and the nut are present in such an exposed portion and thus there is little space even in the use state shown in FIG. 6(*c*). This can effectively prevent entrance of foreign matters in the movable hole 42.

Since the folding table is particularly configured by use of the closing plates 5 to prevent entrance of foreign matters in the movable holes 42, the present embodiment does not need to redesign and remanufacture the folding table itself, differently from the conventional example and enables utilization of an existing one. This can achieve the aforementioned effects similar to those in the conventional example without increasing costs. To be concrete, it is only necessary to provide, as new members, the closing plates 5 and the brackets 21 and 22 each provided with the step 48 for receiving the closing plate 5. For the table body 3 and the spring members 43 to 45 installed in the brackets 21 and 22 and others, existing ones can be directly utilized.

The closing plate 5 is shaped so as to overlap the table body 3 and the bracket 21 without protruding out in each of the use state and the non-use state. Accordingly, even the closing plate 5 which is a thin plate having a thickness of about 1.7 mm is less likely to hit or bump against something and be broken. The closing plate 5 is guided to be slid or positioned by the step 48, so that the closing plate 5 is stably placed in each of the use state and the non-use state or moved between them.

The folding table according to the present invention is explained in the embodiment as above, but it is not limited thereto. The present invention may be embodied in other specific forms without departing from the essential characteristics thereof. For instance, the aforementioned embodiment ensures the installation space of the closing plates 5 by forming the steps 48 in the brackets 21 and 22. As an alternative, each bracket itself may be moved outward to the right and left and fixed thereat to allow each closing plate to be sandwiched between the corresponding bracket and the table body 3.

REFERENCE SIGNS LIST

1 Folding table
2 Supporting member
3 Table body
5 Closing plate 21, 22 Bracket
35 Hinge pin
36 Lock pin
41 Shaft hole
42 Movable hole
43, 44, 45 Spring member
48 Step
51 Shaft-side through hole
52 Movable-hole-side through hole

The invention claimed is:

1. A folding table including a table body provided with a pair of hinge pins oppositely protruding on left and right sides and a pair of lock pins oppositely protruding on left and right sides, and a pair of left and right brackets each having a shaft hole in which the hinge pin serving as a pivotal center is inserted and a movable hole in which a spring member is installed to urge the lock pin inserted therein, the table body being supported pivotally by the brackets fixed to a wall surface,
wherein the folding table includes closing plates that are plate members each having through holes through which the hinge pin and the lock pin of the table body are penetrated, and the closing plates are individually sandwiched between the table body and the brackets to close the movable holes.

2. The folding table according to claim 1, wherein the through holes through which the hinge pin and the lock pin are individually penetrated are long holes, the through hole through which the lock pin is penetrated is smaller than a moving range of the lock pin to allow the closing plate to slide in association with pivoting of the table body.

3. The folding table according to claim 2, wherein a part of the closing plate has a shape conforming to outer shapes of the table body and the brackets when seen from a side in a use state in which the table body is tilted down and in a non-use state in which the table body is oriented upright.

4. The folding table according to claim 3, wherein each of the brackets includes a step on an open side of the movable hole to define a movable range in which the closing plate is allowed to slide, so that each of the brackets provides a recessed area corresponding to the movable range.

5. The folding table according to claim 4, wherein in a use state in which the table body is tilted down and a non-use state in which table body is oriented upright, the closing plates are positioned by abutting on the steps.

6. The folding table according to claim 2, wherein each of the brackets includes a step on an open side of the movable hole to define a movable range in which the closing plate is allowed to slide, so that each of the brackets provides a recessed area corresponding to the movable range.

7. The folding table according to claim 6, wherein in a use state in which the table body is tilted down and a non-use state in which table body is oriented upright, the closing plates are positioned by abutting on the steps.

8. The folding table according to claim 1, wherein each of the brackets includes a step on an open side of the movable hole to define a movable range in which the closing plate is allowed to slide, so that each of the brackets provides a recessed area corresponding to the movable range.

9. The folding table according to claim 8, wherein in a use state in which the table body is tilted down and a non-use state in which table body is oriented upright, the closing plates are positioned by abutting on the steps.

10. The folding table according to claim 1, wherein the table body is pivotally movable relative to the bracket.

* * * * *